United States Patent [19]

Moore et al.

[11] 3,794,055

[45] Feb. 26, 1974

[54] TECHNIQUES FOR BI-DIRECTIONAL FLUID SIGNAL TRANSMISSION

[75] Inventors: Larry R. Moore; Robert F. Turek, both of Silver Spring, Md.

[73] Assignee: Bowles Fluidics Corporation, Silver Spring, Md.

[22] Filed: Feb. 15, 1972

[21] Appl. No.: 226,791

[52] U.S. Cl. ...................... 137/1, 137/814, 137/822, 235/201

[51] Int. Cl. ........................... F15c 1/12, E03b 1/00

[58] Field of Search ...... 137/81.5; 235/201, 201 FS, 235/201 PF

[56] References Cited

UNITED STATES PATENTS

| | | | |
|---|---|---|---|
| 3,075,548 | 1/1963 | Horton | 137/81.5 X |
| 3,378,197 | 4/1968 | Brandriff | 235/201 |
| 3,399,829 | 9/1968 | Richards et al. | 235/201 |
| 3,472,258 | 10/1969 | Blosser, Jr. | 137/81.5 |
| 3,480,030 | 11/1969 | Bermel | 137/81.5 |
| 3,503,423 | 3/1970 | Edell | 137/81.5 |
| 3,552,415 | 1/1971 | Small | 137/81.5 |
| 3,587,611 | 6/1971 | Doherty | 137/81.5 |
| 3,601,137 | 8/1971 | Bauer | 137/81.5 |
| 3,700,005 | 10/1972 | Fletcher et al. | 137/81.5 X |

*Primary Examiner*—Samuel Scott
*Attorney, Agent, or Firm*—Rose & Edell

[57] ABSTRACT

Reliable bi-directional transmission of binary fluid signals over a single transmission path is achieved by utilizing opposite polarity pressure pulses to represent respective binary states. A novel fluid transceiver includes a common passage connected to the transmission path to both receive and transmit positive and negative pressure signals. Detection of received signals is effected either within the transceiver element or at a tap in the transmission path proximate the transceiver. Means are disclosed to compensate the signal detector for continuous ambient flow through the transmission path.

18 Claims, 8 Drawing Figures

TECHNIQUES FOR BI-DIRECTIONAL FLUID SIGNAL TRANSMISSION

BACKGROUND OF THE INVENTION

The present invention relates to bi-directional fluid signal transmission and, in particular to bi-directional transmission of binary fluid signals over a common transmission path.

Transmission of binary signals over considerable distances (for example, 10 or more feet) has not been very efficient in the prior art. Specifically, it has been difficult, if not impossible, to distinguish between binary 0 and binary 1 transmissions. One suggested approach, for example, employs modulated carrier techniques whereby binary 1 and binary 0 are represented by respective modulation frequencies. The basic problem with this approach is that in long distance transmission paths the attenuation versus frequency characteristic of the line would limit practical transmission to very low frequencies, on the order of a few Hz, or to short line lengths.

Another approach would be to use a different positive pressure level to represent each binary level. This approach, termed pulse amplitude encoding, requires bi-level threshold detection at the receiver. If stations are located at varying distances from one another, the threshold circuits at each receiver would have to be carefully adjusted to compensate for a particular transmission line length. Moreover, the decay of the pulse shape during the course of transmission makes accurate amplitude threshold detection extremely difficult. For the same reason, pulse width modulation to distinguish between binary levels is also impractical.

It is therefore an object of the present invention to develop an efficient approach to transmitting binary fluid signals between separated locations.

Another prior art problem related to fluid signal transmission relates to transmission line economy. Specifically, it is desirable to utilize a single transmission path to carry signals in both directions. A major drawback to utilizing a single transmission path relates to signal splitting between the transmitting and receiving circuits at each end of the line. That is, it is necessary, at each end of the line, to assure that received signal power is not lost in the transmitting circuit and that transmitted signal power is not lost in the local receiver circuit. The only practical solution to this problem is disclosed in U.S. Pat. application Ser. No. 5,483 filed Jan. 26, 1970 in the name of Peter Bauer, titled "Bi-Directional Fluidic Elements and Circuits," and assigned to the same assignee as the present invention. In the Bauer invention, each end of the transmission line terminates at an end of an outlet passage of a stream interaction fluidic amplifier. A received signal is fed back down the outlet passage to deflect the amplifier power stream. A transmitted signal is sent out through the outlet passage to the transmission line. While Bauer's approach works quite well, it is not able to generate or detect negative pressure pulses. As described below, one aspect of the present invention involves utilizing positive and negative pressure pulses to represent the two binary signal levels.

It is therefore another object of the present invention to provide an element capable of generating both positive and negative pressure pulse for transmission along a single path.

It is another object of the present invention to provide a device capable of generating positive and negative pressures for transmission and of detecting received positive and negative pressures.

Where ambient conditions at remote stations result in different pressure levels subsisting at those stations, a transmission line interconnecting those stations will experience a steady state flow. Unless compensated for, steady state flows of this type can result in erroneous detection of signals at the remote stations.

It is therefore another object of this invention to provide means for compensating for ambient flow conditions in a fluid signal transmission line.

SUMMARY OF THE INVENTION

According to the present invention binary fluid signal transmission is achieved using positive and negative pressure pulses to represent respective binary states. A novel fluid transceiver element includes an input-output passage connected to a single transmission line. Positive pulses are transmitted by directing such pulses into the input-output passage; negative pressure pulses are transmitted by pulsedly aspirating fluid from the input-output passage. The element end of the input-output passage may terminate in a restriction at which the reception of positive and negative pulses from the transmission line is detected by the deflection of a first sensing jet issued across the restriction. A second sensing jet is issued across the element, some distance from the input-output passage, and senses positive pulses only. The deflected states of the sensing jet pulse is positive or negative.

To isolate the remote station from the effects of steady state flow in the transmission line, a restrictor-volume combination is tapped into the transmission line proximate each station. The time constant of the combination is made longer than the duration of information pulses so that received positive and negative pulses may be sensed across the restrictor portion of the combination.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figures 1, 2:
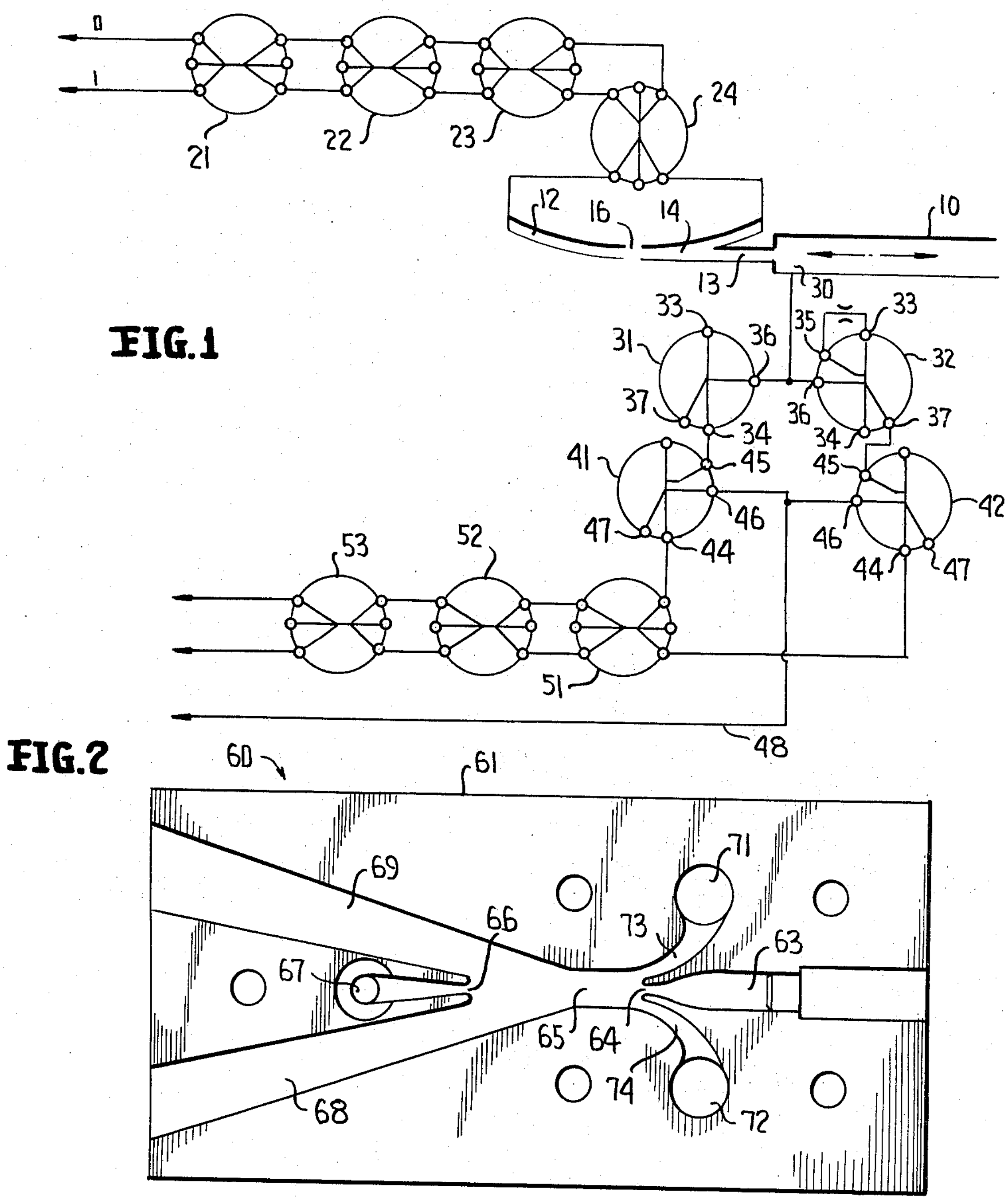
FIG. 1 is a fluidic circuit schematic diagram illustrating one approach to transmitting and detecting both positive and negative pressure pulses using a single transmission line.
FIG. 2 is a plan view of a transceiver element of the present invention with its cover plate removed.

Referring specifically to FIG. 1 of the accompanying drawings, one end of a fluid signal transmission line 10 is terminated by bipolar fluid signal generating element 11. Generating element 11 includes a passage 13 having a downstream end connected directly to transmission line 10. The end of passage 13 remote from the transmission line is positioned to receive positively pressurized fluid issued from passage 12 across a small vented region 16. Such fluid initially creates a compression wave at the mouth of passage 13 which is propagated at approximately sonic velocity along transmission line 10 and defines the leading edge of a positive pressure pulse. Upon termination of the flow from passage 12, a rarefaction wave is developed at passgae 13 and defines the trailing edge of the positive pressure pulse.

Another passage 14 forms a V-configuration with passage 13 and is arranged to issue pressurized fluid at an acute angle across the mouth of passage 13. Fluid thus issued from passage 14 aspirates fluid from passage 13 to initially create an expansion wave in the latter passage. The expansion or rarefaction wave is propagated along transmission line 10, again at approximately sonic velocity, and defines the leading edge of a negative pressure pulse. Termination of flow from passage 14 introduces a compression wave into line 10 which marks the trailing edge of the negative pressure pulse.

Importantly, a sharply defined pulse of positive pressure issued from passage 14 causes not only the rarefaction wave to be propagated along line 10, but also causes a compression wave to closely follow the rarefaction at a distance determined by the duration of the aspirating positive pressure pulse. The following compression wave results from the sudden restoration of ambient pressure at the mouth of passage 13 upon termination of the pulse in passage 14. To our knowledge this is the first time sharply defined, short duration negative pulses have been transmitted any significant distance.

Vented region 16 serves to maintain ambient pressure at the mouth of passage 13. This provides a reference pressure level to which transmitted and received positive and negative pressure levels can be referenced. In addition, vented region 16 prevents a build up of static pressure at the mouth of passage 13; such build up would eventually reduce flow through passages 12 and 14 and prevent pulse transmission.

A transmitter amplifier is provided and includes four cascaded fluidic amplifiers 21, 22, 23, 24 of the stream interaction type. These amplifiers, for example, may be of the tristable type, such as disclosed in U.S. Pat. No. 3,181,545, or of the analog type as disclosed in U.S. Pat. No. 3,275,013. The size of successive amplifier stages and their operating pressures are increased as required to provide desired impedance matching and flow gain. In each amplifier the power stream normally issues from the vented central output passage. The opposite output passages of output stage 24 are connected to supply respective pressure signals to passages 12 and 14 of element 11. Binary 0 and 1 input signals are applied, one at a time, to opposite control ports of input stage 21.

Operation of the transmitter amplifier is such that a binary 1 positive pressure pulse applied to the lower control port of amplifier 21 (as viewed in FIG. 1) results in an amplified positive pressure pulse being delivered to and issued from passage 12 of element 11. This positive pressure pulse is transmitted via transmission line 10 to a remote location. A binary 0 positive pressure pulse applied to the opposite control port of amplifer 21 results in an amplified positive pressure pulse being delivered to passage 14 in element 11. This pulse momentarily aspirates passage 13 to transmit a negative pulse via transmission line 10.

Pulses received from transmission line 10 by element 11 are detected by means of a pressure tap 30 communicating with transmission line at a location proximate passage 13. The pressure in tap 30 is applied to a control port of each two fluidic OR/NOR gates 31, 32. These gates, for example, may be of the type described in U.S. Pat. No. 3,340,885 to Bauer, specifically with respect to FIG. 3 of that patent. Gates 31 and 32 each include a pressure supply port 33 to which a source of constant positive pressure is applied. As a result a power stream normally issues through a NOR output passage 34. If a positive pressure is applied to a control port 36 at sufficiently high pressure to deflect the power stream, the latter is forced to issue from OR output passage 37. In the case of gate 32, a second control port 35 receives a constant bias pressure sufficient to normally cause the power stream of that gate to issue from OR passage 37.

When the pressure at tap 30 in the transmission line is positive, gate 31 is switched to its OR state, removing the output signal from NOR passage 34 of that gate. The positive pressure at tap 30 has no effect on the state of gate 32. When the pressure at tap 30 is negative, the biasing effect at control port 35 of gate 32 is overcome by the negative pressure at control port 36. As a consequence, gate 32 switches to its NOR state. The negative input pressure to control port 36 of gate 31 has no effect on the state of that gate. From the foregoing it is seen that positive pressure at tap 30 is sensed by gate 31 and negative pressure is sensed by gate 32.

In order to prevent the detection circuit from registering a binary 0 or binary 1 in response to a pulse generated at and transmitted from its own station, additional fluidic OR/NOR gates 41, 42 are provided, each, by way of example, being of the same general type as gates 31, 32. The NOR output passage 34 of gate 31 is connected directly to control port 45 of gate 41; the OR passage 37 of gate 32 is connected to control port 45 of gate 42. Neither of gates 41, 42 are provided with a control bias so that the power stream issued from supply port 43 of each gate is directed to NOR passage 44 of that gate in the absence of a positive pressure signal at either of control ports 45, 46. Control ports 46 are connected to a receiver inhibit line 48 which is automatically pressurized (by means not shown) during signal transmission periods for element 11.

The NOR passages 44 of gates 41 and 42 are connected to opposed control ports of a fluidic amplifier 51, which, for example, may be of the same type as amplifiers 21–24. Amplifier 51 is the first of three such amplifiers 41, 52, 53 connected in cascade to amplify the NOR signals from gates 41, 42.

Operation of the overall detection circuit is as follows: Under quiescent conditions when no pulses are transmitted or received at element 11, gate 31 is in its NOR state, causing gate 41 to assume its OR state; gate 32 is in its OR state which causes gate 42 to assume its OR state. Since neither of NOR passages 44 is pressurized, a zero pressure differential exists across the control ports of amplifier 51 and neither a binary 0 nor a binary 1 output signal is provided by amplifier 53.

Assume now that a positive pressure is received at tap 30 and that the receiver inhibit signal is not pressurized. Gates 31 and 32 are both in their OR states; gate 41 is in its NOR state; and gate 41 is in its OR state. NOR passage 44 of gate 42 is thus at a positive pressure, which is amplified by amplifiers 51, 52 and 53 to provide a binary 1 output signal. NOte that if the receiver inhibit signal were present, both gates 41 and 42 would be in their OR states so that no signal would be applied to the amplifiers, irrespective of the states of gates 31 and 32.

Assume now that a negative pressure is detected at tap 30 with the receiver inhibit signal off. Gates 31 and 32 are both in their NOR states; gate 41 is in its OR state; and gate 42 is in its NOR state. The NOR signal from gate 42 is thus amplified to provide a binary 1 output signal from amplifier 53. Again it is noted that the receiver inhibit signal, if pressurized, removes the NOR signals from both of gates 41, 42 to inhibit the output signal of amplifier 53, irrespective of the states of gates 31 and 32.

In the foregoing description it was assumed that positive pulses represent binary 1 and negative pulses represent binary 0. These assignments are arbitrary and may be reversed as desired. In addition, the number of amplifier stages and the specific logic gate arrangement may be varied according to well known design principles to achieve the desired transmission and detection results. The important aspects of the circuit illustrated in FIG. 1 are: (1) the utilization of opposite polarity pressures to represent opposite binary signal levels in long distance signal transmission; (2) the utilization of a single element to transmit both positive and negative pressure signals to thereby permit use of only a single transmission path; and (3) detection of both negative and positive received pressure signals from a common location at a termination point in a single transmission path. With regard to clause (3), it is noted that threshold detection for binary pulses of opposite polarity is considerably simpler than where two amplitudes of the same polarity are employed.

Referring now to FIG. 2 there is illustrated in detail a signal generating element of the type which is illustrated only schematically in FIG. 1. The element 60 is comprised of various passages and channels etched or otherwise formed in a plate 61 in a manner well known in the field of fluidics. Plate 61 may either be a bottom plate in which the passages and channels are formed to a partial depth in the plate and covered by a cover plate (not shown); or it may represent a center plate to be sandwiched between top and bottom plates. In either case, ports are formed through the top or bottom plates, as necessary, to communicate with various passage and channel terminations in plate 61.

Element 60 includes a passage 63 arranged to terminate at a transmission line, such as transmission line 10 of FIG. 1. Passage 63 includes one or more restrictors to provide the desired impedance matching between element 60 and the transmission line. The element end of passage 63 terminates in a nozzle 64. Directly opposite nozzle 64 across a vented region 65 is another nozzle 66 which terminates a positive pressure supply passage. Positive pressure signals applied to an input port 67 are issued across region 65 into nozzle 64 of passage 63 and are transmitted along the transmission path. Two vent passages 68, 69 flare rearwardly and on opposite sides of nozzle 66. These vent passages communicate with ambient pressure to prevent pressure buildup in region 65.

Negative pressure generation is achieved by applying positive pressure to input ports 71, 72. These ports feed passages 73 and 74, respectively, which terminate on opposite sides of nozzle 64 and are directed generally toward vent passages 68, 69 across vented region 65. Positive pressure signals applied to ports 71, 72 (preferably simultaneously) act to aspirate nozzle 64, producing an expansion wave in passage 63 transmitted along the transmission line. The actual fluid issued from passages 73, 74 is vented from element 60 via passages 68, 69. As mentioned above in relation to element 11 of FIG. 1, a sharp, narrow aspiration pulse results in a rarefaction followed by a compression propagated along the transmission line.

Element 60 can be modified to incorporate a received pulse detector, rather than utilizing a separate transmission line tap such as tap 30 of FIG. 1. The resulting element would be a true transceiver, capable of both generating pulses for transmission along a transmission line and detecting the binary state of pulses received from the transmission line. The modification required to achieve this result is illustrated diagrammatically in FIGS. 3 and 4 in which elements depicted are assigned the same reference numerals as in FIG. 2. A first pair of opposed ports 76, 77 are axially aligned in a direction perpendicular to the major plane or plane of fluid flow in element 60. The axis of ports 76, 77 passes through nozzle 64. Another set of ports 78, 79 are similarly aligned along an axis parallel to the axis of ports 76, 77. The axis of this second set of ports passes through vented region 65 beyond nozzle 64 but on the central axis of that nozzle. Consequently, fluid flow in passage 63 which issues through nozzle 64 produces a marked effect on the pressure between ports 78, 79.

One of each pair of ports serves as a nozzle for issuing a sensing jet; the other port serves as a receiver for the sensing jet. Assume, for example, that pressurized fluid is applied to ports 77, 79 and that respective sensing jets are issued toward ports 76, 78. Now, if a positive pressure pulse is received from the transmission line, the sensing jet from nozzle 77 is deflected and port 76 experiences a reduction in pressure. Likewise, if a negative pulse is received at element 60, fluid is aspirated from region 65 and passages 73, 74 into nozzle 64 and passage 63. This fluid also deflects the sensing jet issued from nozzle 77 so that a reduction in pressure is once again experienced at port 76.

Figure 6:
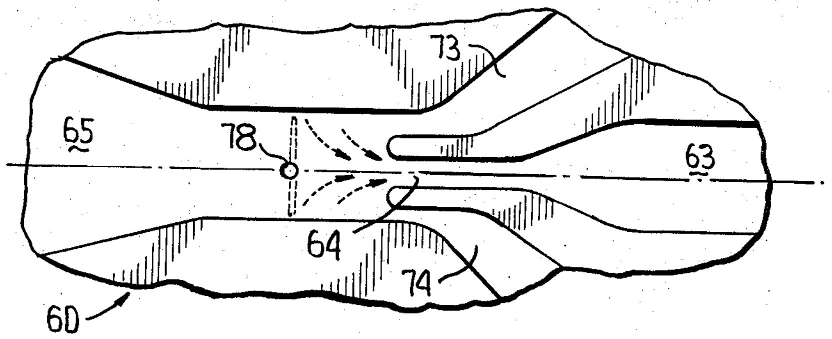
FIG. 6 is a diagrammatic illustration of the effect of received negative pressure in the transceiver of FIG. 2.

Port 76 thus experiences a pressure reduction in response to reception of both positive and negative pressure pulses. To distinguish polarity of received pulses, ports 78, 79 are provided. Specifically, a received positive pressure pulse issuing from nozzle 64 has a transverse velocity profile of generally bell-shape, as illustrated by dashed lines in FIG. 5. The flow velocity of the pulse is sufficient to deflect the sensing jet issued from nozzle 79 so that port 78 experiences a pressure reduction. On the other hand, a received negative pressure pulse draws fluid from the entire vented region 65 and from passages 73, 74 as illustrated in FIG. 6. The flow field created in response to a received negative pulse is thus less collimated than that created by a positive pulse. The resulting flow velocity across the axis of nozzle 79 and port 78 is therefore very small and insufficient to deflect the sensing jet issued from nozzle 79. Port 78, therefore, experiences no pressure reduction in response to a received negative pulse.

Figure 3:
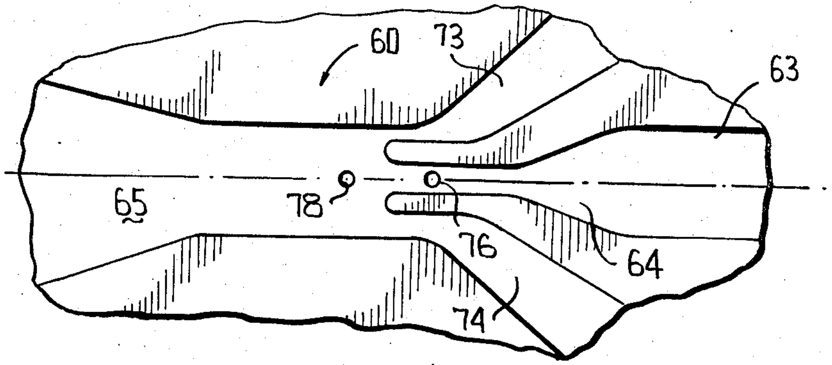
FIG. 3 is a diagrammatic illustration of an approach for using the transceiver of FIG. 2 to detect both positive and negative received pressure signals.
Figures 4, 5:
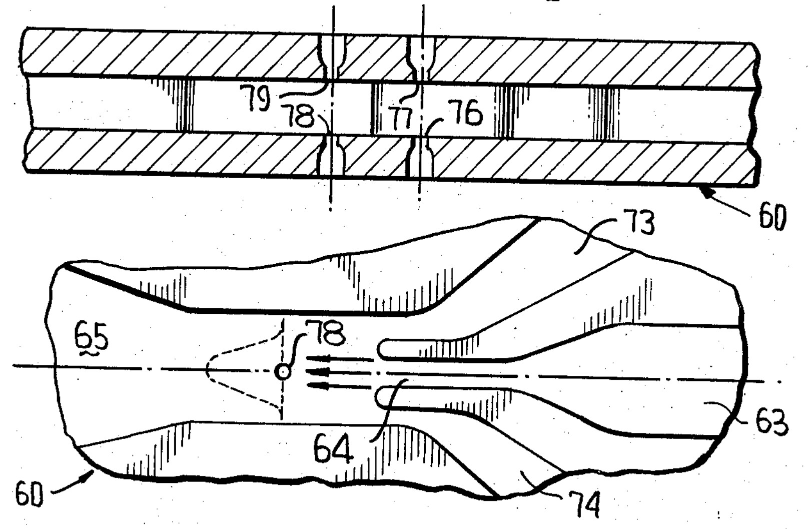
FIG. 4 is a sectional view taken along lines 4—4 of FIG. 3.
FIG. 5 is a diagrammatic illustration of how received positive pressure pulses are detected in the transceiver of FIG. 2.

The received pulse detecting arrangement of FIGS. 3 and 4 is thus able to distinguish between three distinct conditions: (I) no received pulse; (II) received positive pulse; and (III) received negative pulse. Specifically, if positive pressure at port 76 is represented by the letter A, and positive pressure at port 78 is represented by the letter B, then the three sensed conditions may be represented as follows:

$$\mathrm{I} = A \cdot B$$

$$\mathrm{II} = \overline{A} \cdot \overline{B}$$

$$\mathrm{III} = A \cdot \overline{B}$$

Appropriate fluidic inverters and logic may be employed in conjunction with these logic conditions for utilization and/or indication of received binary pulses. Of course transmitted signals from element 60 also deflect the sensing jets; however, receiver inhibit signals (as employed in FIG. 1) may be utilized in the detection logic circuit to prevent transmitted pulses from affecting the utilization and/or indicating elements.

The direction of the sensing jets need not be precisely as indicated in FIGS. 3 and 4. For example, the jets need not be directed into or out of the plane of the drawing in FIG. 3; rather they may be directed within that plane and still be intercepted perpendicularly by received signals. In other words, the sensing jets may be issued across the width of nozzle 64 and region 65 rather than across the depth.

Figure 7:
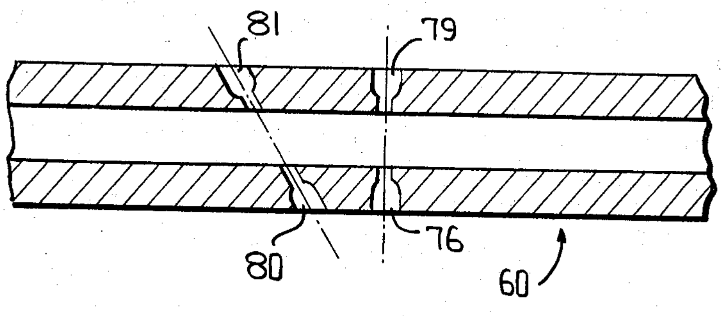
FIG. 7 is a view like that of FIG. 4 illustrating a modification to the sensing approach of FIGS. 3 and 4.

Another possible modification is illustrated in FIG. 7 wherein ports 76 and 77 remain as in FIG. 4 but ports 78 and 79 have been replaced by ports 80 and 81. The latter ports are aligned on an axis which diverges from the axis of ports 76 and 77 in the direction of positive received flow through nozzle 64. A sensing jet issued from port 81 is normally received by port 80 (or vice versa). A received positive pressure tends to deflect the sensing jet relative to the receiving port to reduce the pressure at the receiving port. Two main advantages ensue from this angled port arrangement. First the distance along the sensing jet over which the received positive flow acts is increased, thereby increasing deflection sensitivity of the jet. Second, however, the positive received pressure flow can exert a shear component on the sensing jet to slow it down and thereby further reduce the pressure at the receiver. In this regard it is more advantageous to issue the jet from port 81 than from port 80, since the latter would issue a jet whose velocity would be augmented by the second pressure and therefore would tend to increase the pressure at port 81.

Figure 8:
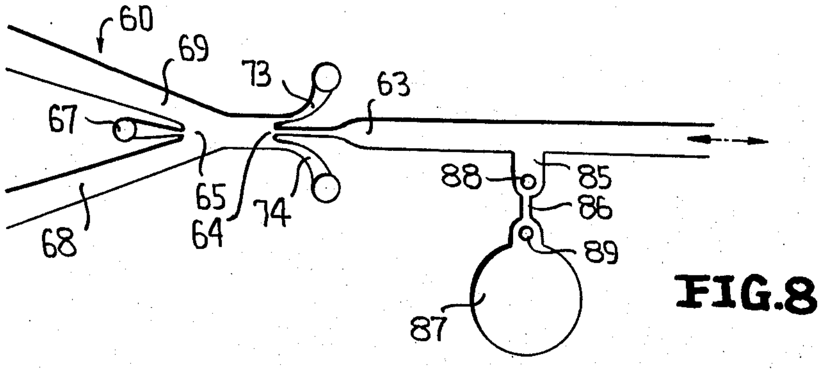
FIG. 8 is a schematic diagram of means for compensating for the effects of ambient flow in a transmission line.

A problem sometimes encountered in transmitting fluid signals over relatively long distances results from the fact that stations at opposite ends of the transmission line may be at different ambient pressures. This pressure difference causes a steady state or ambient flow along the transmission line. If the flow is strong enough it may be sensed as a signal or it may have other adverse affects on detection capability at the receiver. A solution to this problem is illustrated schematically in FIG. 8. In this embodiment the received signal detector is once again removed from inside element 60 and instead utilizes a separate tap 85 off the transmission line at a location proximate the element. Tap 85 feeds a restrictor 86 which in turn feeds a fluid capacitor in the form of volume 87. Restrictor 86 and volume 87 comprise a fluid RC circuit, analogous to the RC (resistor-capacitor) circuit used in electronics. This circuit serves as a filter in the manner to be described.

Sensing jet arrangements 88 and 89 are illustrated schematically on respective sides of restrictor 86, each jet arrangement being of the same type described above in relation to FIGS. 3 and 4. Jet arrangement 88 may be located within restrictor 86, if desired, as is the case with arrangement 76, 77 of FIG. 4. Importantly, however, jet arrangement 88 only senses received negative pulses rather than sensing both positive and negative pulses as it would if it were located in the nozzle region of restrictor 86.

The time constant of the restrictor-volume circuit is made large relative to the duration of binary pulses employed in the system. Consequently, the pressure in volume 87 does not change in response to the signal pulses but rather remains pressurized at a constant pressure determined by ambient pressure and flow in the transmission line. The pressure across restrictor 86, however, does respond to the signal pulses, substantially in the same manner as the pressure across restrictor 64 in FIG. 3. Thus, positive received pulses deflect both sensing jets 88 and 89; but negative received pulses deflect only sensing jet 88. The detectors are thus isolated from ambient flow through the transmission line.

While we have described and illustrated specific embodiments of our invention, it will be clear that variations of the details of construction which are specifically illustrated and described may be resorted to without departing from the true spirit and scope of the invention as defined in the appended claims.

We claim:

1. The method of transmitting binary fluid signals between spaced locations via a common transmission path, said method comprising the steps of:

generating a positive pressure pulse in correspondence with each binary signal of a first state to be transmitted;

generating a negative pressure pulse in correspondence with each binary signal of a second state to be transmitted; and applying said positive and negative pulses, as generated, to one end of said common transmission path;

wherein generation of said negative pulse comprises the steps of:

normally maintaining said one end of said common transmission path at ambient pressure; and pulsedly aspirating said one end of said transmission path by flowing a pulse of positive pressure thereby.

2. The method of transmitting binary fluid signals between remote locations via a common transmission path, said method comprising the steps of:

generating a positive pulse in correspondence with each binary signal of a first state to be transmitted;

generating a negative pulse in correspondence with each binary signal of a second state to be transmitted;

applying said positive and negative pulses, as generated, to one end of said common transmission path;

receiving at said one end of said common transmission path positive and negative pressure pulses transmitted from a remote location via said common transmission path; and detecting and determining the polarity of said received pressure pulses.

3. The method according to claim 2 wherein the steps of generating, receiving and detecting said pressure pulses are performed in a single transceiver element.

4. The method according to claim 2 further comprising the step of filtering ambient flow through said common transmission path to prevent such flow from adversely affecting said step of detecting.

5. The method according to claim 2 wherein the step of detecting includes the steps of:

issuing a first sensing jet across a predetermined region;

directing received positive pulses across said predetermined region in deflecting relationship with said first sensing jet; and sensing deflection of said first sensing jet.

6. The method according to claim 5 wherein said first sensing jet includes a flow component directed opposite to the flow direction of said received positive pulses such that said positive pulses exert a shear force on said first sensing jet to retard the velocity of the latter.

7. The method according to claim 6 wherein said step of detecting comprises the steps of:

issuing a first sensing jet across a predetermined region through which received positive pressure pulses flow, said first sensing jet being positioned to be deflected by said received positive pressure pulses but to be unaffected by received negative pressure pulses;

issuing a second sensing jet across a predetermined region through which said positive pressure pulses flow and in which a flow is created by said received negative pressure pulses, said second sensing jet being positioned to be deflected by said received positive pressure pulses and by the flow created by said received negative pressure pulses; and detecting deflection of each of said first and second sensing jets.

8. The method according to claim 7 wherein said steps of generating, receiving and detecting are all effected in an integral transceiver element having a single termination at said common transmission path.

9. A fluid operated apparatus for transmitting both positive and negative fluid pulses along a single transmission line to a remote station, said apparatus comprising:

a first fluid passage terminating at said transmission line at one end and having an open mouth at its second end;

a second fluid passage, spaced from said second end, and disposed to issue positive fluid pressure pulses applied thereto into said open mouth of said first fluid passage;

a third fluid passage terminating adjacent said second end and positioned to issue a positive fluid pressure pulse applied thereto across said open mouth to pulsedly aspirate fluid from said first fluid passage, whereby a rarefaction wave is transmitted through said first fluid passage and said transmission line.

10. The apparatus according to claim 9 further comprising a vented region disposed between said second fluid passage and the open mouth of said first fluid passage, said open mouth thereby being maintained at ambient pressure in the absence of positive pressure fluid pulses issued from said second and third fluid passages, whereby said rarefaction wave in said first fluid passage is followed by a compression wave at a distance determined by the duration of the positive pressure pulse issued from said third fluid passage, said compression wave representing the restoration of ambient pressure at the open mouth of said first passage.

11. The apparatus according to claim 10 further comprising means for sensing positive and negative pressure pulses received by said first passage from said transmission line, said means for sensing being part of an integral structure with said first, second and third passages.

12. The apparatus according to claim 11 wherein said means for sensing includes:

means for issuing a first sensing jet across said first fluid passage, proximate said open mouth such that said first sensing jet is deflected by both positive pressure pulses received from said transmission line and by ambient fluid aspirated into said open mouth by negative pressure pulses received from said transmission line;

means for issuing a second sensing jet across said vented region, spaced from but across said open mouth of said first passage, at a location such that said second sensing jet is deflected by positive pressure fluid pulses received from said transmission line and issued through said open mouth, said second sensing jet being substantially unaffected by negative pressure fluid pulses received at said first passage from said transmission line;

means for detecting deflection of said first and second sensing jets.

13. The apparatus according to claim 12 wherein said means for issuing said second sensing jet is oriented such that said second sensing jet includes a flow component opposite the direction of flow of said received positive pressure pulses, whereby said positive pressure fluid pulse exerts a shear force on said second sensing jet to retard the velocity of said second sensing jet.

14. The apparatus according to claim 10 further comprising:

a fluid flow restrictor having one end in direct flow communication with said transmission line proximate said apparatus;

a pressure volume having a single opening connected to the other end of said flow restrictor; and means for sensing positive and negative pressure pulses in said transmission line at said one end of said flow restrictor;

wherein said flow restrictor and said volume have a time constant which is long relative to the duration of said positive and negative pressure pulses.

15. The apparatus according to claim 14 wherein said means for sensing includes:

means for issuing a first sensing jet across said flow restrictor such that said first sensing jet is deflected by both positive and negative pressure pulses appearing in said transmission line at said flow restrictor;

means for issuing a second sensing jet in the region between said flow restrictor and said volume such that said second sensing jet is deflected by positive pressure pulses but not negative pressure pulses appearing in said transmission line at said flow restrictor; and means for detecting deflection of said first and second sensing jets.

16. In a fluid signal transmission system in which fluid pressure pulses of known duration are transmitted via a common fluid transmission line between two remote stations, apparatus for sensing received pulses at one of said stations without interference by steady state ambient flow through said transmission line, said apparatus including:

a fluid flow restrictor having one end in direct flow communication with said transmission line proximate said one of said stations;

a pressure volume having a single opening connected to the other end of said flow restrictor;

means for sensing said pressure pulses received at said flow restrictor;

wherein said flow restrictor and volume have a time constant which is long relative to the duration of said pressure pulses.

17. The apparatus according to claim 16 wherein both positive and negative pressure pulses of known duration are transmitted between said stations, said means for sensing including:

means for issuing a first sending jet across said flow restrictor such that said first sensing jet is deflected by both positive and negative pressure pulses appearing in said transmission line at said flow restrictor;

means for issuing a second sensing jet in the region between said flow restrictor and said volume such that said second sensing jet is deflected by positive pressure pulses but not negative pressure pulses appearing in said transmission line at said flow restrictor; and means for detecting deflection of said first and second sensing jets.

18. In a fluid signal transmission system wherein positive and negative pressure pulses are transmitted between two spaced stations via a common fluid passage, a positive and negative pressure pulse sensor comprising:

a nozzle terminating said common fluid passage and emptying into an enlarged vented region;

means for issuing a first fluid jet transversely through said nozzle such that said first fluid jet is deflected by both positive and negative pressure pulses received at said nozzle from said fluid passage;

a receiver positioned to receive said first fluid jet when undeflected;

means for issuing a second fluid jet transversely across said enlarged vented region at a location spaced from but aligned with said nozzle such that said second fluid jet is significantly deflected by positive but not negative pressure pulses received at said nozzle from said common fluid passage; and a receiver positioned to receive said second fluid jet when undeflected.

* * * * *